United States Patent [19]
Wisshaupt

[11] Patent Number: 5,196,645
[45] Date of Patent: Mar. 23, 1993

[54] PROCESS AND DEVICE FOR THE DETECTION OF THE SECTORIAL PROXIMITY OF A TARGET, AND WEAPON USING THE DEVICE

[75] Inventor: Daniel Wisshaupt, Orleans la Source, France

[73] Assignee: Thomson-Brandt Armements, Boulogne Billancourt, France

[21] Appl. No.: 809,916

[22] Filed: Dec. 18, 1991

[30] Foreign Application Priority Data

Dec. 28, 1990 [FR] France .................. 90 16436

[51] Int. Cl.$^5$ .................................. F42C 13/03
[52] U.S. Cl. ....................................... 102/213
[58] Field of Search .................. 102/213; 244/3.16

[56] References Cited

U.S. PATENT DOCUMENTS

| | | | |
|---|---|---|---|
| 3,496,367 | 2/1970 | Eckermann | 250/203 |
| 3,786,757 | 1/1974 | Goldstein et al. | 102/213 |
| 3,942,446 | 3/1976 | Cruzan | 102/213 |
| 4,043,672 | 8/1977 | Baumgartner | 356/152 |
| 4,195,574 | 4/1980 | MacNeille | 102/213 |
| 4,627,351 | 12/1986 | Thordarson et al. | 102/213 |
| 5,018,446 | 5/1991 | Benedikter et al. | 102/213 |

FOREIGN PATENT DOCUMENTS

| | | |
|---|---|---|
| 0139322 | 5/1985 | European Pat. Off. . |
| 2714178 | 3/1977 | Fed. Rep. of Germany . |
| 2319137 | 2/1977 | France . |
| 1605516 | 6/1978 | France . |
| 2612288 | 9/1988 | France . |
| 60-205381 | 10/1985 | Japan . |
| 1511641 | 5/1978 | United Kingdom ......... 102/213 |

*Primary Examiner*—Charles T. Jordan
*Attorney, Agent, or Firm*—Marmorek, Guttman & Rubenstein

[57] ABSTRACT

Optical device rotational about an axis XX', and making use of a set of detectors suitably arranged to detect the presence of a target in a determined solid angle, of the type which includes in longitudinal section in a plane P in which lies the axis XX', a window including a front point A and a rear point B, which admits radiation coming from an axis H intersecting axis XX' at a point 0 and forming with it an angle $\Theta$ of less than 90°, the opening angle $2\tau$ of the window being represented by the two straight lines 0'A and 0"B, each forming the angle $\tau$ with the axis H, characterized by the fact that it includes two mirrors M1, M2 and a converging lens, the mirror M1 being represented in the section of plane P by the arc of a parabola $P_{m1}$ with its focus at a point F located in front of point 0, and having as its axis of symmetry an axis D1 parallel to H and passing through F, the mirror M2 being represented in the section of plane P by the arc of a parabola $P_{m2}$ with its focus at the point F and having as its axis of symmetry an axis $\delta$ passing through F and forming with the axis XX' a small angle $\alpha$; finally, the lens, having its optical center on the axis XX' approximately at the intersection of the parabola $P_{m1}$ with this axis.

17 Claims, 10 Drawing Sheets

PROCESS AND DEVICE FOR THE DETECTION OF THE SECTORIAL PROXIMITY OF A TARGET, AND WEAPON USING THE DEVICE

BACKGROUND OF THE INVENTION

This invention concerns optical and optronic systems for proximity detection.

Such detectors already exist; they are fitted to weapons or missiles, and their function is to trigger the detonation of the weapon, or of a warhead carried by the missile, when the weapon or missile "nears" a target.

To this end, known detectors include a window, fitted to the nose cone or the body of the weapon. This window is transparent to a predetermined range of frequencies; an optical device enables surveillance of an angle of observation $\Theta$ relative to the longitudinal axis XX' of the missile or weapon. The angle $\Theta$ is generally slightly less than 90°. The optical device enables radiation to be captured in a solid rotational angle around the axis of the missile or weapon.

Radiation given off by the target in the solid angle determined by the optical input is reflected by a mirror towards a detector. This is illustrated in FIGS. 1, 2, and 3.

FIG. 1 shows a missile (1) which carries a detector window (2). The bisecting axis of a cross-section of the field makes an angle $\Theta$ of a little less than 90° with the longitudinal axis XX' of the missile. The bisecting axes on either side of the axis of symmetry of the missile or projectile meet at point 0. The angle of opening of this window is $2\tau$. The window enables the capture of radiation coming from any point within a rotational volume bounded by two surfaces. The first of these surfaces is a rotational cone with its apex at a point 0', which is set slightly ahead of point 0. The generator of the cone is a straight line set at an angle $(\Theta - \tau)$ to axis XX'. The second of these surfaces is a rotational cone with its apex at a point 0'', which is situated slightly behind point 0. The generator of the second cone is a straight line set at an angle $(\Theta + \tau)$ to the axis of rotation of the missile.

FIG. 2 shows a simplified diagram of missile (1) approaching a target (3), which is represented by a triangle. Target (3) includes a hot spot (4).

FIG. 3 shows a ray (5) coming from the hot spot (4) in FIG. 2 and entering the missile through the window (2). This ray is reflected by a 360° mirror (6) symmetric about the missile axis, towards a detector (7) which is sensitive to the radiation given off by the hot spot (4). Upon sensing the radiation, the detector emits a signal which is amplified and processed to trigger the detonation of a warhead whose zone of influence is rotationally symmetric about axis XX'.

As has been illustrated, existing passive optronic detectors do not detect the "nearness" of the target, but only its transit.

The highest degree of proximity between the target and the missile is often reached at the moment when the missile crosses the target; this is particularly noticeable when the target and the missile have convergent trajectories. When the trajectories are not convergent, the transit may not be the point of closest proximity between target and missile; this is particularly true of highly maneuverable missiles. Moreover, captured radiation may originate from a distant source lying within the volume of detection; such a source may be a target other than the one under pursuit an individual lure, or the sun—if the detector is sensitive to the radiation of such bodies.

Furthermore, existing detectors sense the crosswise motion of the target, but they do not enable determination of the precise solid angular sector containing the target. These deficiencies necessitate the use of a warhead with an efficient volume rotationally symmetric about axis XX' of the projectile. For the same mass, a directed-effect warhead in the direction of the target would have significantly greater efficiency.

Finally, due to their design, existing systems require a detector (7) to be placed towards the front of the missile.

This may make it more difficult to integrate any possible detector cooling system.

Signal-processing systems can be located elsewhere, insofar as this is allowed by the low level of signals generated by the detectors; however, it then becomes necessary to use available volume for connections and the cables carrying signals. This must be set against the fact that in a weapon, the goal is to reduce the weight and volume of anything other than the warhead.

SUMMARY OF THE INVENTION

The invention aims to counter the disadvantages outlined above and also to enable determination of the precise solid angular sector containing the target, so that a directed-effect warhead can be utilized. A warhead is described as having a "directed effect" when its effect (shock wave and fragments) occurs in an angular sector at a predetermined roll angle. The invention also aims to move the radiation detectors towards the rear of the missile or weapon, so as to simplify the sitting and architecture of cooling systems and the circuits processing the signal generated by the detectors. Finally, in certain versions, the invention aims to provide a more reliable determination of the nature of the target and its proximity; this increases the efficiency of the invention in the presence of artificial or natural lures, such as the sun and certain surfaces reflecting the sun.

To achieve these objectives, the invention makes use of a system wherein a given detector covers only a part of the detection volume. The invention also includes an optical system enabling the volume of detection to be divided into sectors which can be assigned to a particular detector set behind the detection window, as well as the detector unit containing the optical device and detectors. Finally, the invention makes use of the detector unit with signal-processing circuits in order to provoke or delay detonation, according to the sequencing of signals coming from various detectors or, in certain configurations, in order to determine the weapon or missile attitude by determining the direction of the ground or sky.

More precisely, the invention concerns a process which is in particular applicable to a munition or a missile with an axis XX' equipped with means of detecting the transit of a target emitting radiation, in a volume $\Omega$ referred to as a "detection volume" delimited by the rotational surfaces created by straight lines corresponding to the field limits of an optical device and determined by the geometry of detectors with diaphragms, in particular by a window referred to as a "detection window", conical or cylindrical in form and rotationally symmetric about the axis XX', characterized by the fact that n volume sectors are selected, $\Omega_1, \Omega_2, \ldots \Omega_n$, included in the volume $\Omega$ and that a particular detector is biuniquely assigned to each of the n volume sectors.

It is advantageous to divide the volume into angular sectors defined on the one hand by the rotational surfaces defining the entire detection volume and on the other hand by m planes intersecting the munition's rotational axis, two consecutive planes forming between them the angle $2\pi/m$ (in this case m=n).

The basic advantage of the invention being to facilitate the efficient use of a directed-effect warhead, the angle $2\pi/m$ of the detection sectors must be less than or equal to the angular sector of maximum efficiency of the warhead.

When the detection volume is defined by the rotational surfaces about the munition's axis, the volume is often determined, as explained earlier, by two straight lines intersecting the munition's axis at points 0' and 0", and coincident with the edges of a rotational window around the periphery of the munition, the two straight lines forming an angle r with the optical axis H of the window. In a plane containing the axis of the munition, the axis H is the straight line passing through point 0 and the center of the segment representing the intersection of the window and the plane. For such a volume it is advantageous not only to divide it into angular sectors defined as above, but also to divide each of the angular sectors into two parts, a front part and a rear part. The front part is defined on the one hand by the conical surface created by the rotation of the straight line which goes through 0' forming an angle $(\Theta - \tau)$ with the axis of the munition and, on the other hand, by the conical surface created by the straight line which passes through 0' forming an angle $(\Theta - \tau/P)$, P representing a number greater than 1. The rear part is defined on the one hand by the conical surface created by the rotation of the straight line which passes through 0" forming the angle $(\Theta + \tau)$ with the munition's rotational axis and by the conical surface created by the straight line which passes through 0" and forms an angle $(\Theta + \tau(p1/p))$ with the axis of the missile.

It may be noticed in this last case that the detection volume is divided into 3m parts (n=3m) because each of the m angular sectors is divided into three parts: a front part, a rear part and, between the two, a central part. The advantage of this central part will be explained later. It can, however, be noted at this point that in this case it is of no importance whether or not the surface divided by the intersection of the surfaces defining the central volume with the surface of the munition is a window. That means that in this case the window can be formed of two transparent surfaces situated one behind the other.

It was indicated earlier that the invention also concerns an optical device which makes it possible to allocate to each of the volume sectors a particular detector situated behind the detection window. More precisely, the invention concerns an optical device rotational about an axis XX', of the type including, in a section along a plane P containing the axis XX', a window having a front point A and a rear point B, admitting the radiation coming from a direction H forming an angle $\Theta$ of less than 90° with the axis XX', the opening angle $2\tau$ of the device being determined by the geometry of the sensitive surface of the detectors, towards which the optical device directs the radiation, characterized by the fact that it includes two mirrors M1, M2 and a converging lens, the mirror M1 being represented in the section of plane P by the arc of a parabola $P_{m1}$ with its focus at a point F located in front of point 0, and having as its axis of symmetry an axis D1 parallel to H and passing through F, the ends of the arc C and H being defined in relation to the angular field of the optics in order to obtain the optimal opening, the mirror M2 being represented in the section of plane P by the arc of a parabola $P_{m2}$ with its focus at the point F and having as its axis of symmetry an axis $\delta$ passing through F and forming with the axis XX' a small angle $\alpha$; finally, the lens, having its optical center on the axis XX' approximately at the intersection of the parabola $P_{m1}$ with this axis.

The angle $\alpha$ is selected so that the rays reflected by the mirror M2, which travel parallel to $\delta$, cross the axis XX' at the position of the lens L.

The device described above makes it possible to match biuniquely a plane surface element dV, situated in the focal plane of the lens L, with each element of solid angle $d\Omega$ having its apex at 0 and situated in the detection volume.

Therefore, the optical device which has just been described may be used with plane detectors arranged in the focal plane of the lens with surface $V_1, V_2, V_3, \ldots V_n$, each of the detectors thus arranged corresponding respectively to one of the solid angles $\Omega_1, \Omega_2, \ldots \Omega_n$.

BRIEF DESCRIPTION OF THE DRAWINGS

The invention will now be described with reference to the attached drawings wherein.

DESCRIPTION OF THE PREFERRED EMBODIMENT

Figure 1:
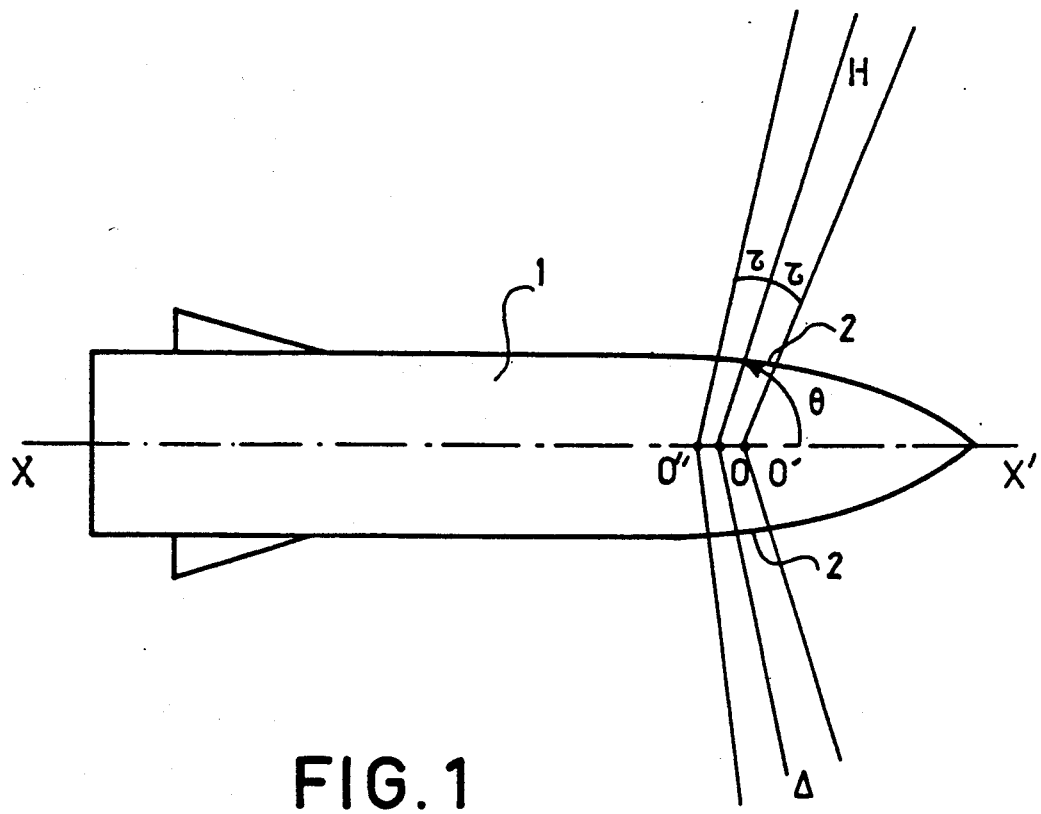
FIG. 1 illustrates a cross-section of a missile with an optical window.
Figure 2:
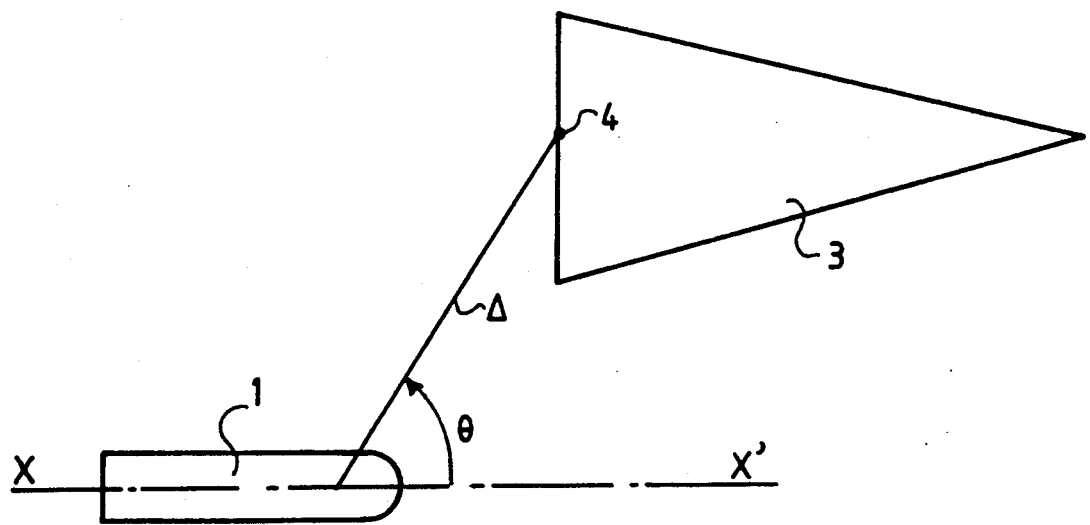
FIG. 2 illustrates a missile approaching an optically radiating target.
Figure 3:
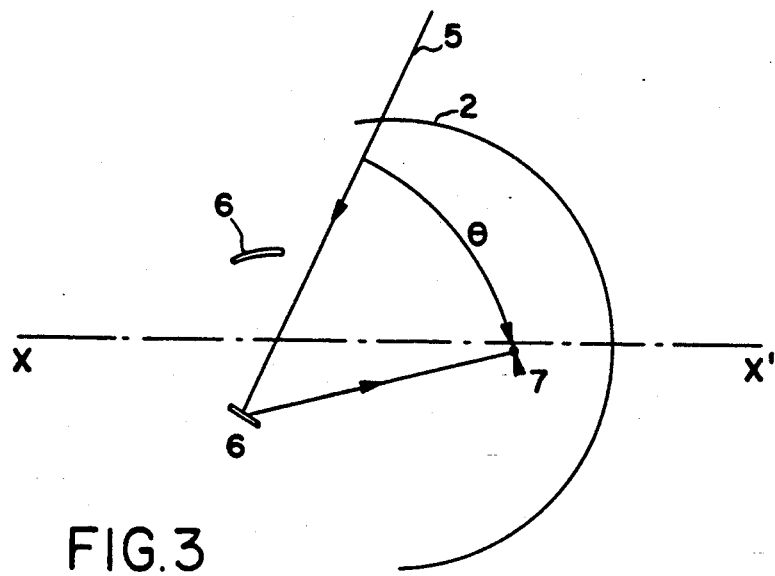
FIG. 3 illustrates how optical radiation enters the missile through an optical window.
Figure 4:
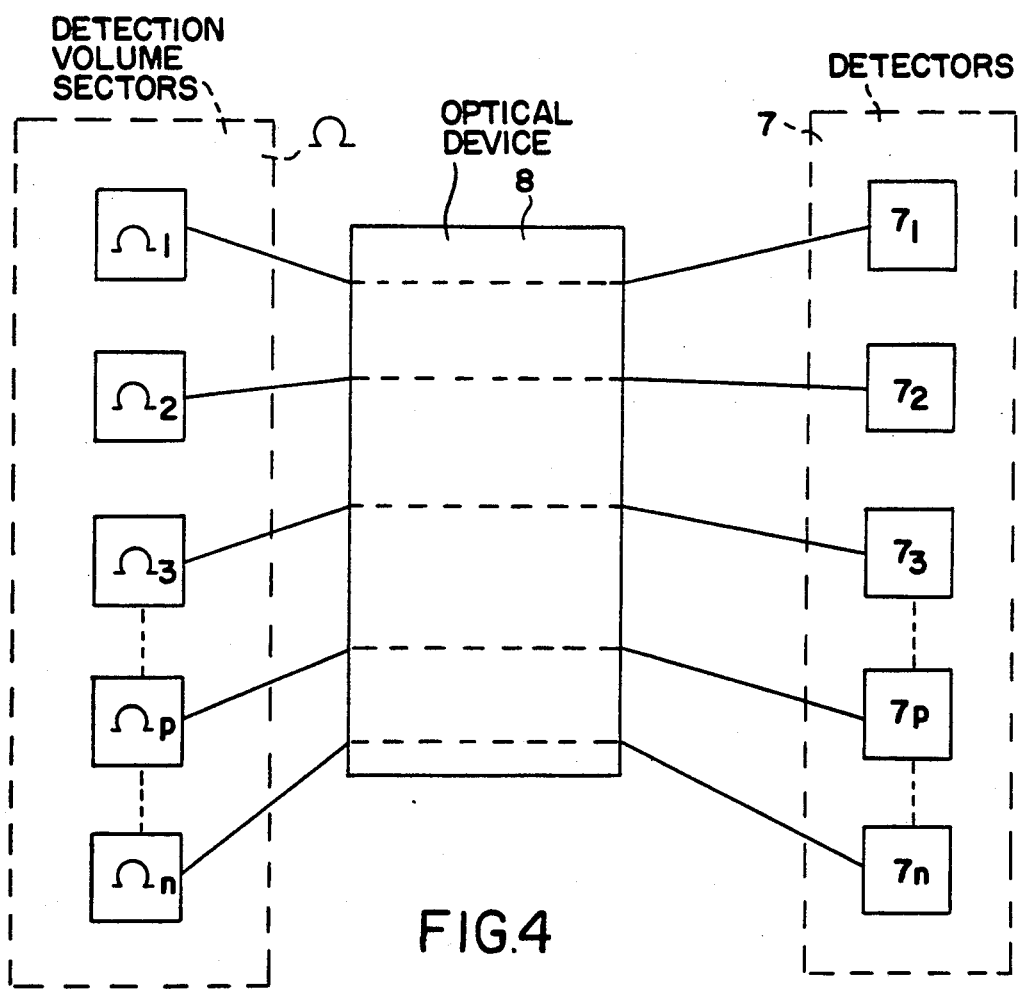
FIG. 4 illustrates the process of the invention in its most general embodiment.

In FIG. 4, a device 8 is illustrated which causes a detector $7_1, 7_2, \ldots 7_p, \ldots 7_n$ forming part of a detector unit 7, to correspond to each sector $\Omega_1, \Omega_2, \ldots \Omega_p, \ldots \Omega_n$ of the total detection volume $\Omega$.

The sum of the n volume sectors of the volume $\Omega$ can be less than or equal to the total volume $\Omega$. On the other hand, the unit 7 comprising n detectors $7_l$ to $7_n$ corresponding to each of the sectors of the volume $\Omega$ constitutes the complete detector unit.

Figure 5:
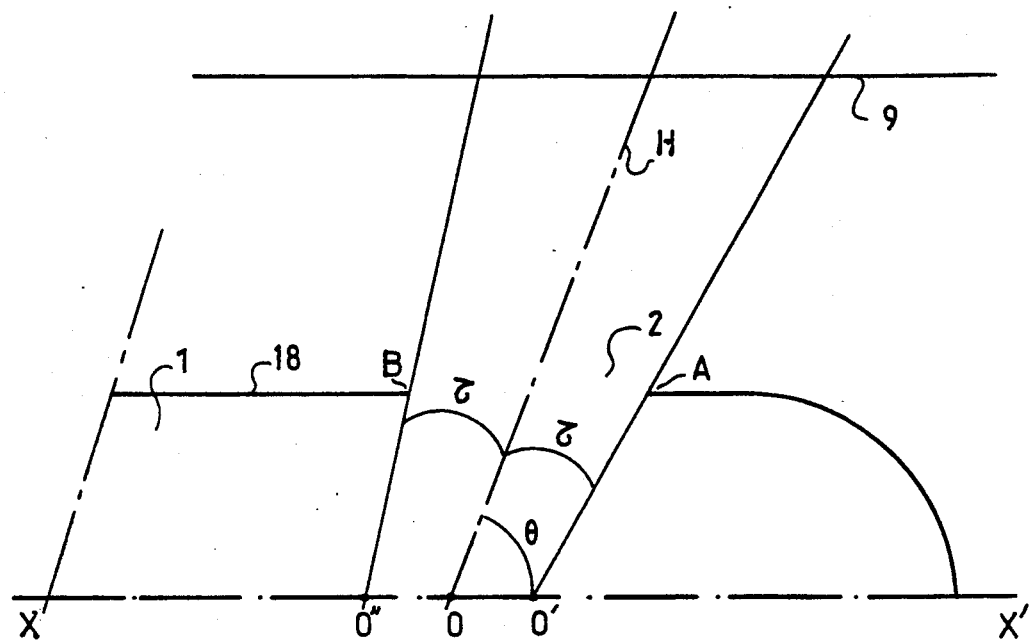
FIGS. 5 and 6 illustrate the method and a form of division of the detection volume.
Figure 6:
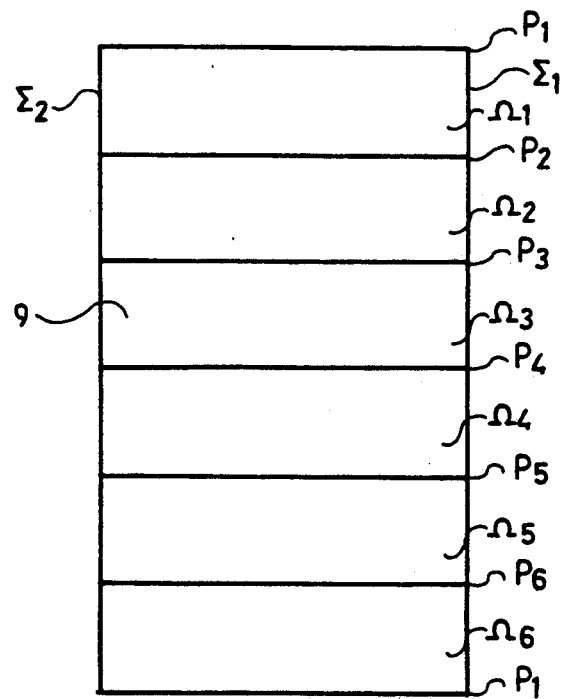

FIGS. 5 and 6 are intended to illustrate the usual form of the volume and a first method of dividing this volume.

FIG. 5 illustrates the front part of a munition 1 including a casing 18, a rotational axis XX' and detection window 2, transparent to the types of radiation detectable by the detectors which will be described later.

FIG. 5 represents a section in a plane containing XX'. In this representation the window 2 is seen as a break in the munition's casing 18. In this drawing the optical axes H of the window form an angle $\Theta$ with the axis XX', the opening angle is marked by the angle r which is formed by each of the straight lines O'A and O"B with the axis H. The points A and B are the front and rear edges of the window 2. The total detection volume is the volume contained between the two conical surfaces ($\Sigma$1, $\Sigma$2) created by the rotation of the two straight lines O'A and O"B about the axis XX'.

In order to illustrate a first method of dividing this volume, a virtual cylinder 9 is represented in FIG. 5. In a first method of division, the volume $\Omega$ is divided by the planes P1, .. Pm containing XX' and forming between them angles equal to $2\pi/m$. The surfaces of cylinder 9 divided by each of the planes P1, P2, ... Pm and the conical surfaces $\Omega$1, $\Omega$2, ... are represented in FIG. 6 on a flat surface (corresponding to the cylinder 9 "unrolled"). In FIG. 6, m is equal to 6.

Figure 7:
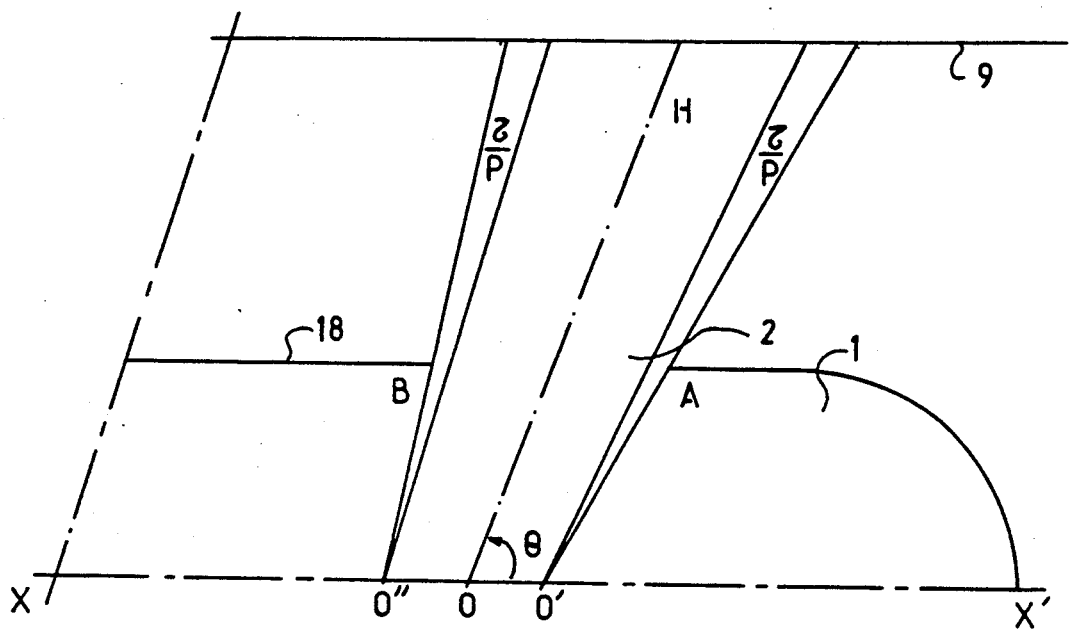
FIGS. 7 and 8 illustrate another form of division of the detection volume.
Figure 8:
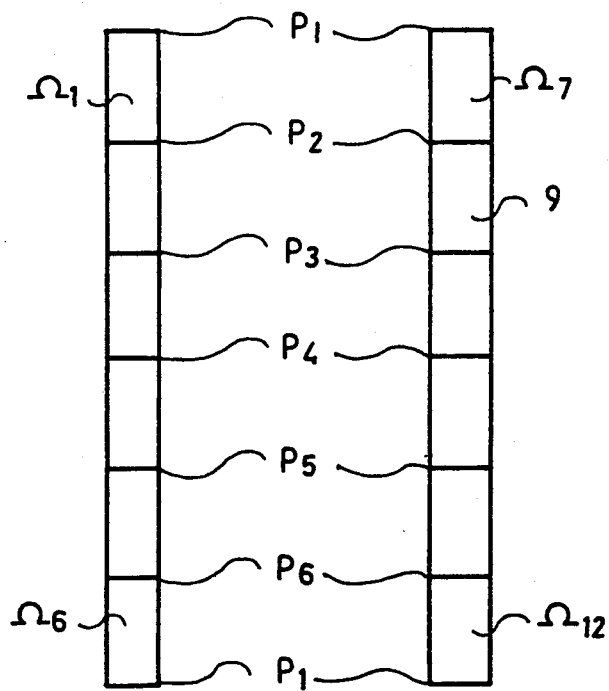

FIGS. 7 and 8 illustrate another method of division in which the detection volume $\Omega$ has been divided into a front part and a rear part, the front part being a volume delimited by two surfaces created by the rotation of two straight lines about the axis XX': the straight line 0'A and a straight line which forms the angle $\tau/P$ (P>1) with it. The rear part is a volume delimited by the surfaces created by the straight line 0"B and a straight line forming the angle $\tau/P$ with 0"B.

These two volumes are in turn divided into sectors by the planes P1 ... Pm containing XX'.

FIG. 8 illustrates as before the surfaces on the virtual cylinder 9 corresponding to the volume sectors. They are rectangles as in the preceding case but narrower and twice the number. In the figure m has been chosen equal to 6. In this case n is equal to 12 and the sum of these 12 volumes does not represent the total volume because the central part is not used.

Figure 9:
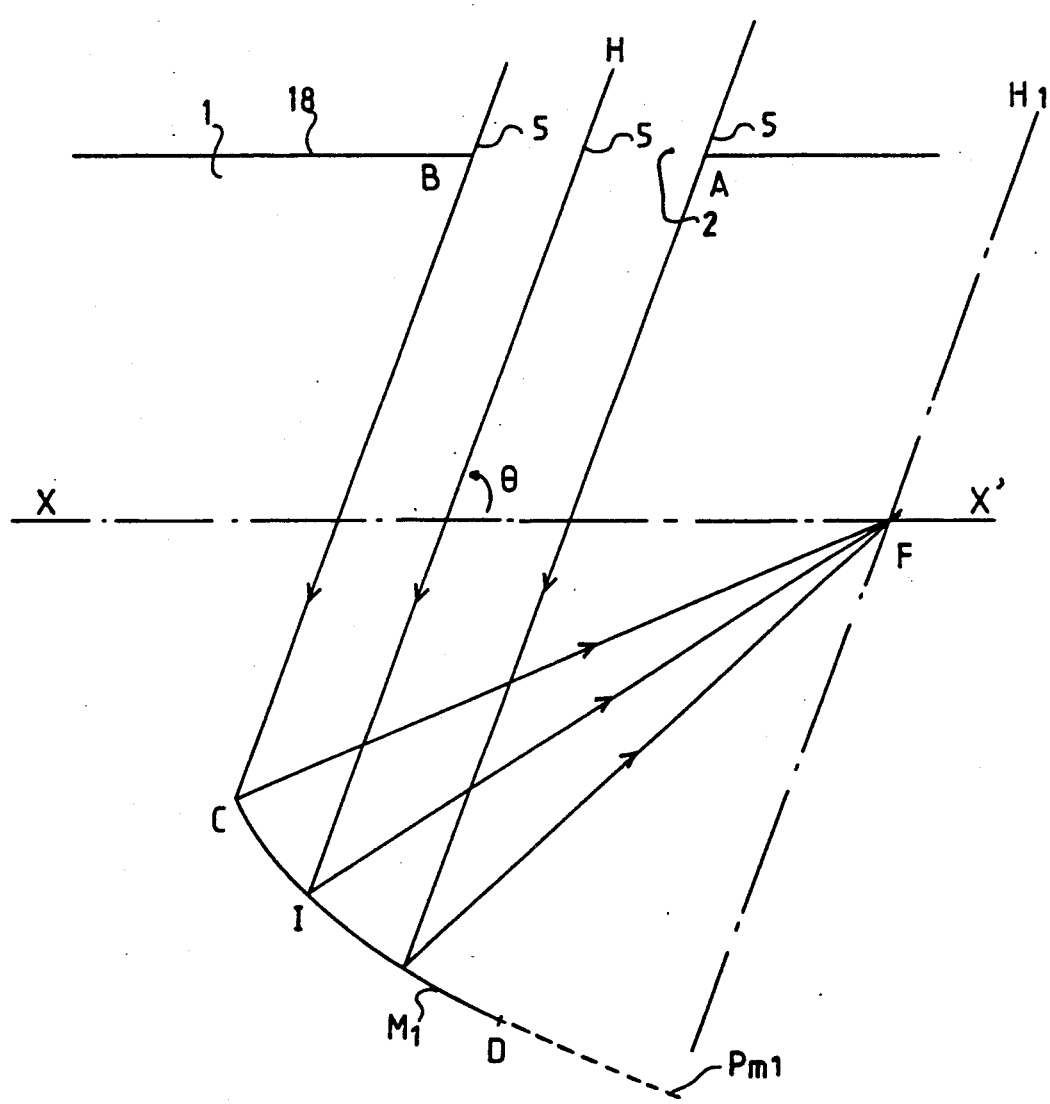
FIG. 9 illustrates the form of the mirror M1.

FIG. 9 illustrates the form and the function of the mirror M1. We recall that the mirror M1 is the first mirror of a device 8 which in this case is optical, making it possible to have an elementary surface dV corresponding to each elementary part of a volume d$\Omega$.

FIG. 9 shows a ray 5 coming from the direction H through the window 2 of the projectile and reaching a mirror M1 at the point I. The mirror M1 is an arc of a parabola $P_{m1}$ with a focus F. The point F is situated in front of the point 0. The axis of symmetry of the parabola is D1 parallel to H and passing through F. It follows that all the rays parallel to H and hitting M1 will be reflected towards F which is thus the point of convergence of the rays coming from the direction H. The arc is limited at the points C and H, determined so as to obtain maximal opening of the angular field of the optics. In the configuration in FIG. 9, the size of the mirror enables maximal use of the opening of the window.

Figure 10:
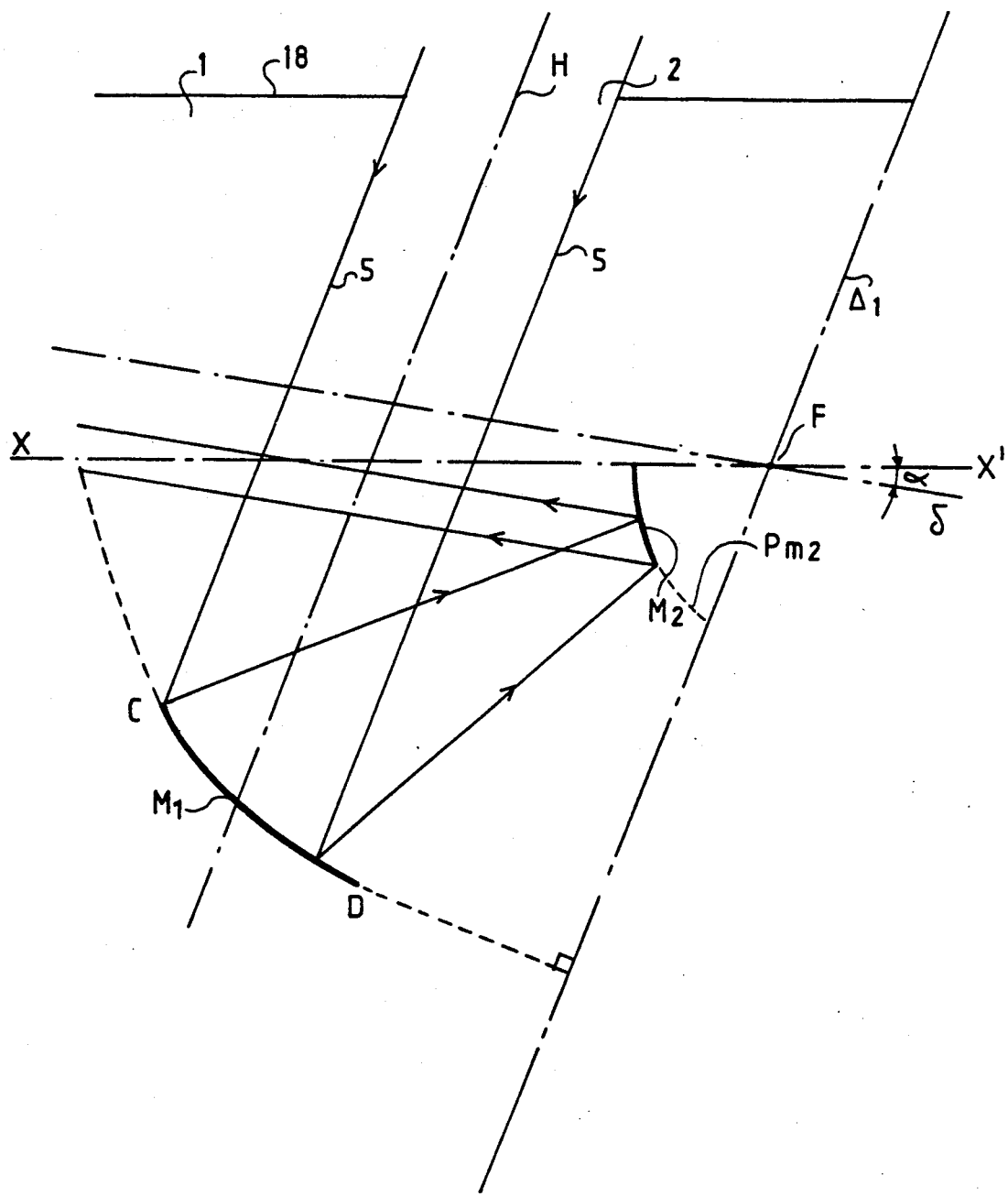
FIG. 10 illustrates the form of the mirror M2.

The position, the form and the role of the mirror M2 will now be explained with reference to FIG. 10.

This figure has the same elements as FIG. 9 but the mirror M2 is now included. The latter is a convex rotational mirror obtained by the rotation about XX' of an arc of a parabola $P_{m2}$. The axis of this parabola is the straight line $\delta$ passing through F, the focus of mirror M1, and forming with the axis XX' of the munition an angle $\alpha$, which is generally small. The rays coming from mirror M and travelling towards the focus F are re-flected parallel to $\delta$. The angle $\alpha$ between $\delta$ and XX' is chosen so that the rays reflected from the mirror M2 cross the axis XX' at a point on this axis where a converging lens 12, which will be discussed later, is positioned. This means that the rays converging towards F are reflected towards the rear parallel to the axis $\delta$.

According to what has just been explained, the parabolas $P_{m1}$ and $P_{m2}$, of which the arcs of the mirrors M and M2 form a part, are only defined by their axes of symmetry and their focuses. There are therefore two families of parabola which are suitable for the required function. The parabolas of these families are only different in the position of their directrice. The choices within these two families will be made taking into account the constraints which are:

the dimensions of the munition, diameter and length of the available housing;

the necessity for the mirror M2 to be as close as possible to 0 while leaving the passage free for the rays from the window 2 to the mirror M1;

the necessity for the surface Vp representing a volume $\Omega$p to be the size of a commercially available detector or group of detectors.

Figure 11:
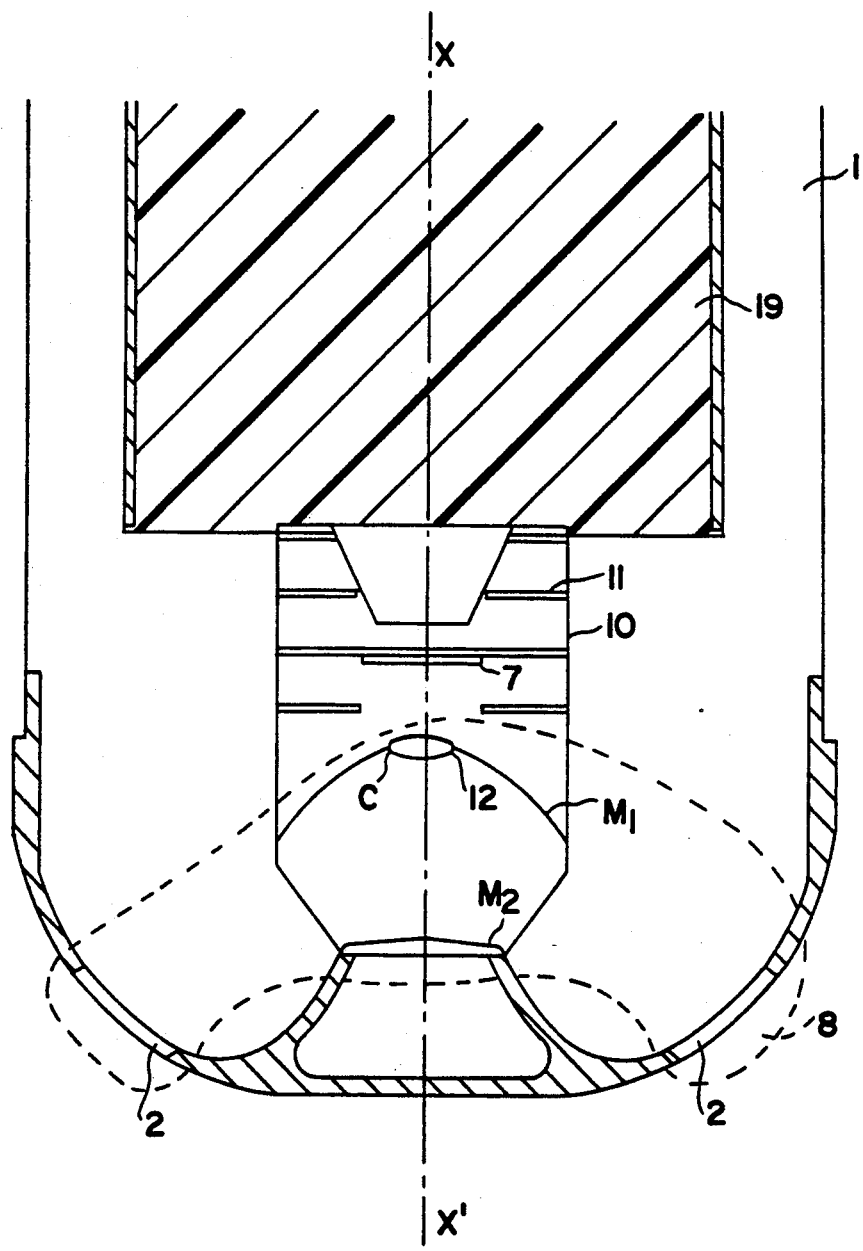
FIG. 11 is a partial longitudinal section of a munition illustrating the detector unit.

The architecture of the detection device assembly will now be explained with reference to FIG. 11 which is a longitudinal sectional view of a munition having the optical device 8, the detectors 7, a device 10 for amplifying the signal(s) from the detectors 7, a logic circuit 11 for processing the signals amplified and transformed by the device 10, and a directed-effect military warhead 19.

In this figure the optical device assembly 8 is shown. This device includes the window 2, equipped with a filter (not shown). This filter makes it possible to restrict the admitted frequencies to those to which the detectors 7 are sensitive. It also includes the mirrors M1 and M2 whose form, positions and functions were previously defined.

Finally, it includes a focussing lens 12 having the same axis as the rotational axis of the munition and mounted perpendicularly to this axis, supported by a structure resting on the edge C of the mirror M1. This lens converges the rays reflected from the mirror M2 towards an array of detectors 7. It also makes it possible to adjust surface V corresponding to the detection volume so that each sector of this volume corresponds to a surface whose dimensions are those of a commercially available detector. Devices 10 and 11 will not be described, the manufacture of such types of device being well known.

Some examples of arrangements of detector arrays 7 will now be described with reference to FIGS. 12 to 15.

It was seen, in the descriptions of FIGS. 5 and 6, and a straight line which forms the angler/P (P>1) with that for each of the angular sectors $\Omega$1 ... $\Omega$n of a detection volume, the principle of the invention was to make each sector correspond biuniquely to only one detector. It was also seen that the optical device 8 matches each element of volume d$\Omega$ with a corresponding plane surface dV in the focal plane of lens 12. It is noticed at this stage that device 8 produces from the detection volume a total plane image in the form of an annular surface S1 delimited by two concentric circles. The division of this surface, and thus of the detection volume, in order to distinguish a particular volume sector, is thus in fact due to the positioning of the detectors.

Figure 12:
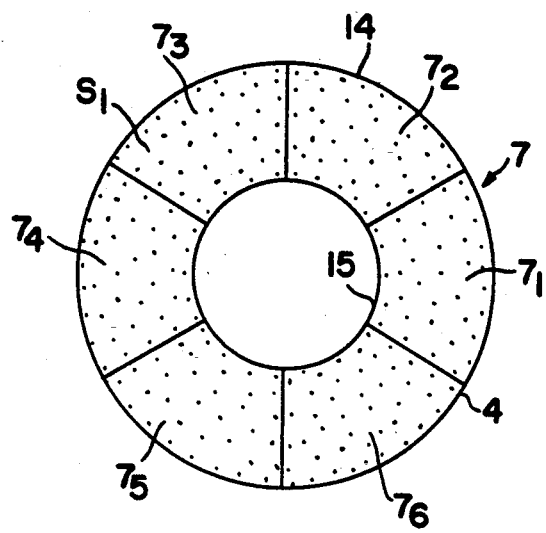
FIGS. 12 to 15 illustrate the arrangement using commercially available detectors, according to the volume divisions chosen.

In the case described in FIGS. 5 and 6 the plane image is represented for the total detection volume by the shaded area between the two circles 14 and 15 in FIG. 12. Each sector $\Omega_1 \ldots \Omega_6$ of the detection volume corresponds to a sector $7_1$ to $7_6$ of this annulus. Ideally the 6 sensors $7_1$ to $7_6$ should have the form shown in FIG. 12.

Existing detectors are either isolated detectors, usually rectangular in shape, or detector matrices, for example pyro-electric retinas. These retinas consist of square detectors arranged in lines and columns, each of the detectors forming a pixel of the total retinal image. The location of each pixel is defined by its address, which consists of a line number and a column number; each pixel can be addressed separately.

The detectors chosen must therefore be arranged, or addressed in the case of retinas, in order to reproduce as closely as possible the form shown in figure 12, where each of the detectors $7_1$ to $7_6$ is ideally in the form of a section of a annulus.

Figure 13:
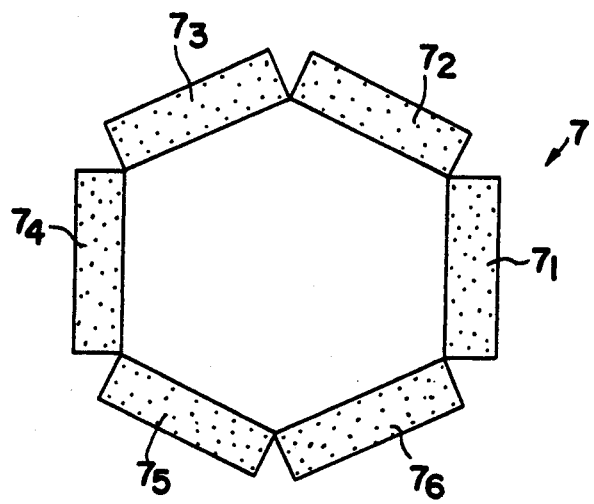

In the case of isolated detectors the layout may be that shown in FIG. 13, where the long sides of the rectangular detectors $7_1$ to $7_6$ are placed side by side so as to form a regular polygon.

Figure 14:
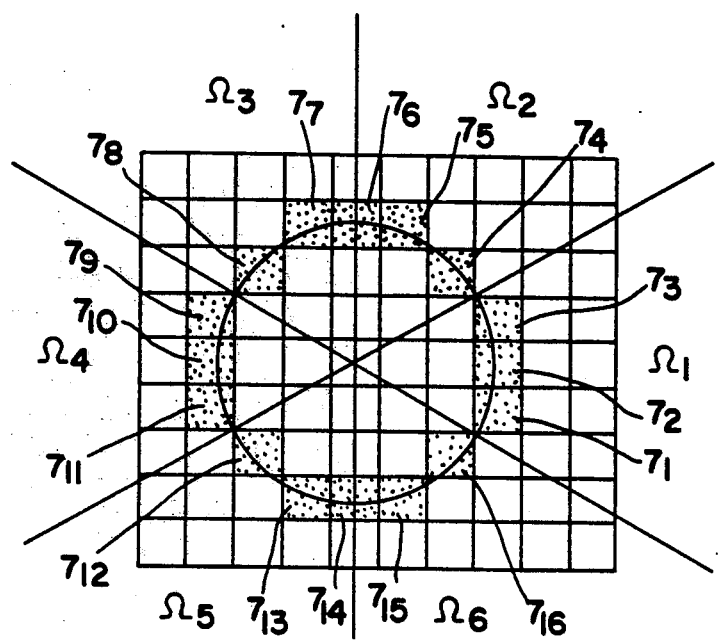

In the case of a retina, the addressed detectors may be those which are crossed by a circle whose center is one of the pixels of the matrix and whose radius is the distance from this center to the common corner of four pixels forming a square, as illustrated in FIG. 14.

In the case represented in FIG. 13, each detector corresponds to a particular detection volume sector and no detector overlaps two sectors. The processing of the signal is thus simple: it is sufficient to determine that the target is located in the angular sector corresponding to the detector receiving the signal, or, in the case of two signal receptions by two consecutive detectors, in the sector corresponding to the detector receiving the strongest signal. Taking into account the compromises which must be made in practice, it is also possible to envisage detectors which overlap two sectors.

In the particular case shown in FIG. 14, 16 pixels labelled $7_1$ to $7_{16}$ are arranged approximately in the form of surface S1, covering six 60° sectors $\Omega_1$ to $\Omega_6$, so that pixels $7_1$ to $7_3$ and $7_9$ to $7_{11}$ correspond to sectors $\Omega_1$ and $\Omega_4$ without overlapping; pixels $7_4$, $7_5$, $7_7$, $7_8$, $7_{12}$, $7_{13}$, $7_{15}$, and $7_{16}$ form unambiguously part of sectors $\Omega_2$, $\Omega_3$, $\Omega_5$, $\Omega_6$.

On the other hand, pixels $7_6$ and $7_{14}$ fall in two sectors, $\Omega_2/\Omega_3$ and $\Omega_5/\Omega_6$ respectively. If none of the signals received on any one of these adjacent pixels eliminates the ambiguity, the treatment of the signal received by one of these two pixels may in that case consist of a simple decision to attribute the detection of a target to one or other of the two sectors. Other processes are possible, but will not be dealt with here because they depend on the way in which the directivity of the warhead is obtained.

Figure 15:
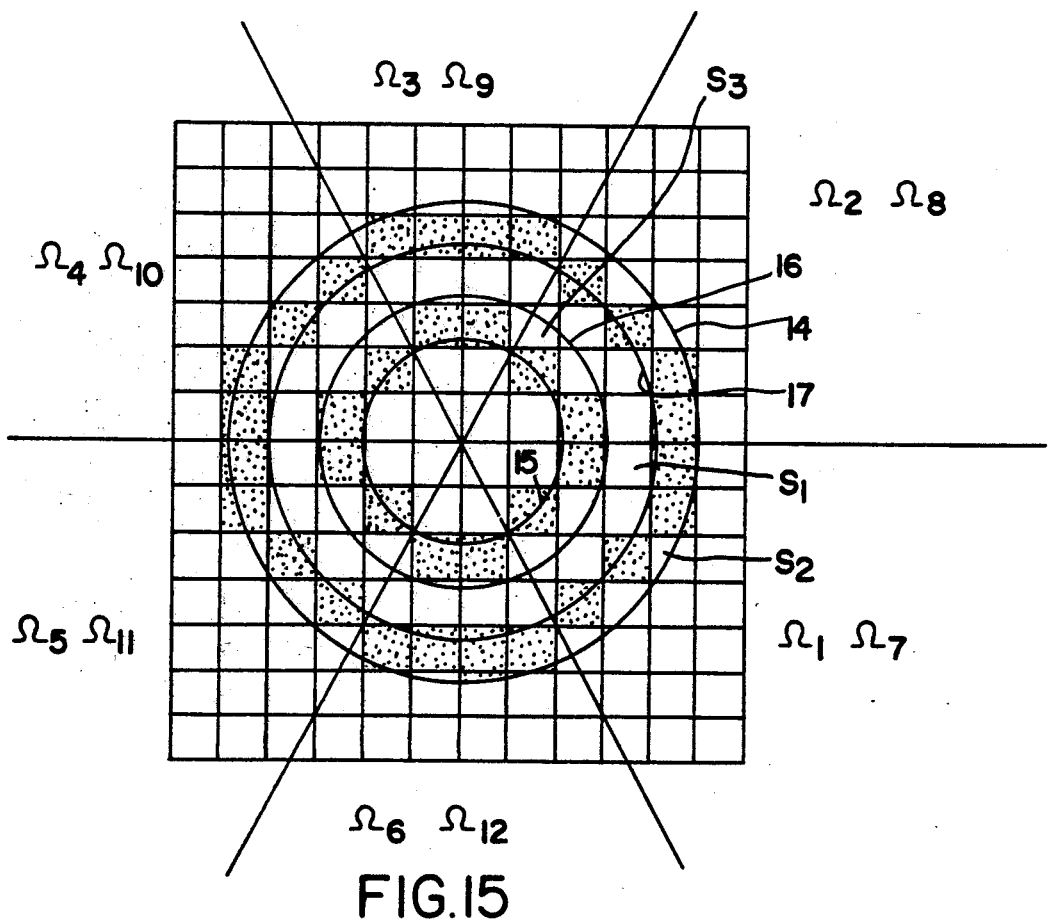

FIG. 15 illustrates on the one hand a second way of selecting the pixels of a matrix in order to form an annulus, and on the other hand a possible selection when one wishes to form the image of sectors $\Omega_1$ to $\Omega_{12}$ illustrated in FIGS. 7 and 8.

In FIG. 15, the total detection volume is represented by surface S1 enclosed between circles 14 and 15. All the parts of angular sectors $\Omega_1$ to $\Omega_6$ are represented by surface S2 enclosed between circles 14 and 17, and all the parts of angular sectors $\Omega_7$ to $\Omega_{12}$ are represented by surface S3 enclosed between circles 15 and 16.

Circles 14 to 16 are concentric. They share the same center situated at the common point of four pixels forming a square and their radius is equal to a whole number of sides of the squares forming the pixels. In the case illustrated in FIG. 15, for m=6, each of the parts of sectors $\Omega_1$ to $\Omega_6$ is represented by 2 pixels and each of the parts of sectors $\Omega_7$ to $\Omega_{12}$ is represented by four pixels.

The detectors 7 used may be, for example, photovoltaic detectors made of InSb or Hg/Cd/Te materials in which the proportions of Hg, Cd and Te are adapted to facilitate detection in the chosen frequency band. In the case of retinas, the multiplexor circuit may be provided by a charge transfer device.

Operation of the munition equipped with device 8, detectors 7, circuits 10 and 11 and a directed effect warhead 19 is as follows: when at least one of the detectors 7 receives radiation in its sensitivity band, that detector sends out a signal which is amplified and transformed by circuit 10. If the signal's amplitude and duration exceed predetermined thresholds, the logic circuit 11 triggers the detonation of the warhead 19 in such a way as to direct the effects of the warhead into the sector containing the source of the signal.

Figure 16:
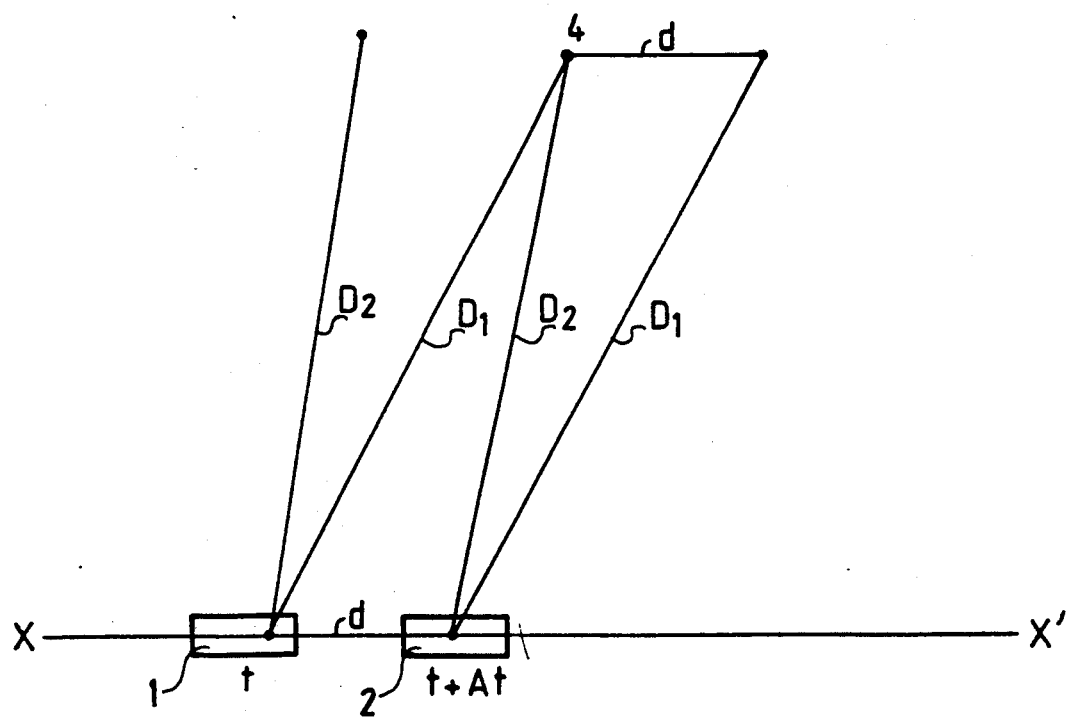
FIG. 16 illustrates the advantage of a particular configuration of the invention.

In the case where the detector has the configuration defined by FIG. 15, the detonating signal is in addition limited by a maximum period of time between the signal from a detector on surface S3 and the signal from a detector on surface S2, and by the consistency of the information received from the S3 and S2 detectors. The reason for this logical choice is illustrated in figure 16. This figure represents a hot point 4 whose radiation is sensed at time t by a detector on surface S2 detector and at time t+dt by a surface S3 detector. In FIG. 16 the straight lines D1 and D2 correspond to the front and rear detection axes illustrated in FIG. 7. During time dt the missile has travelled the distance d. The velocity of the missile being either measured or estimated, it is possible to calculate or estimate d. On the basis of these data, it is possible to calculate the distance of the hot point 4, if all the angles are known.

The size of the radiating source can also be evaluated by the duration of reception of a signal from the source on one or several detectors.

The processing carried out by the logic circuit 11 may be used to eliminate natural or artificial lures or targets too far away, on the basis of information about the duration of signals by each of the detectors, their address and the time between signal receptions by different detectors. In the case of simple munitions, the differences in level between signals of long duration received by the half of the detectors corresponding to the observation sectors in the sky, and the half corresponding to observation sectors on land, can be processed by the signal transformer 10 or the logic circuit 11, in order to roughly determine the roll position of the munition.

It should be noted in general that the purpose of the invention is not to determine the sectorial elements very precisely. It is sufficient to obtain a good enough determination to enable the warhead 19 to have a strong probability of producing its maximal effect in the sector where the target is located.

What is claimed is:

1. A process for detonating a projectile having a longitudinal axis XX' and an optical device with detectors, said process comprising:

detecting the transit of an optically radiating target in a particular one of a plurality of solid detection volume sectors $\Omega_1, \Omega_2 \ldots \neq n$ which together form a rotational detection volume $\Omega$ about XX', said detection volume $\Omega$ being delimited by the rotational surfaces created by the straight lines defined by the optical field of said optical device, which in turn depend upon the dimensions of the surfaces of said detectors, each detection volume sector $\Omega 1, \Omega 2 \ldots \Omega n$ being uniquely allocated to at least one detector, said step of detecting comprising sensing optical radiation emitted by said target at a detector corresponding to said particular detection volume sector in which said target is located, and detonating said projectile in the direction of said particular detection volume sector in which said target is located.

2. A process for detonating a projectile having a longitudinal axis XX' and an optical device with detectors, said process comprising:

detecting the transit of an optically radiating target in a particular one of a plurality of solid detection volume sectors $\Omega 1, \Omega 2 \ldots \Omega n$ which together form a rotational detection volume $\Omega$ about XX', said detection volume $\Omega$ being delimited by the rotational surfaces created by the straight lines defined by the optical field of said optical device, which in turn depend upon the dimensions of the surfaces of said detectors, each detection volume sector $\Omega 1, \Omega 2, \ldots \Omega n$ being uniquely allocated to at least one detector, said detection volume sectors being delimited by said rotational surfaces defining the whole detection volume $\Omega$ and by m planes containing said longitudinal axis XX' of said projectile, said step of detecting comprising sensing optical radiation emitted by said target at a detector corresponding to said particular detection volume sector in which said target is located, and detonating said projectile in the direction of said particular detection volume sector in which said target is located.

3. Process according to claim 2, wherein the angle between two consecutive planes is equal to $2\pi/m$.

4. A process applicable to a projectile having a longitudinal axis XX' comprising detecting the transit of a radiating target in a particular one of a plurality of detection volume sectors $\Omega 1, \Omega 2, \ldots, \Omega n$ which together form a rotational detection volume $\Omega$ about the axis XX', said detection volume $\Omega$ being delimited by the rotational surfaces created by the straight lines defined by the field of an optical device which is in turn dependent upon the dimensions of the detector surfaces, wherein the volume sectors $\Omega 1, \Omega 2, \ldots \Omega n$, forming the volume $\Omega$, are chosen arbitrarily, wherein a specific detector is a located biuniquely to each of these n volume sectors.

wherein the n volume sectors are delimited on the one hand by the rotational surfaces defining the whole detection volume, and on the other hand by m planes intersecting the rotational axis of the projectile, and wherein each angular volume sector is also divided into two parts, a front part and a rear part.

5. An optical device, in a projectile having a longitudinal axis XX' equipped with means for detecting the transit of a radiating target in a rotational detection volume $\Omega$ about the axis XX', delimited by the rotational surfaces created by the straight lines defined by the field of said optical device which is in turn dependent upon the dimensions of the detector surfaces, wherein the volume sectors $\Omega 1, \Omega 2, \ldots \Omega n$, forming the volume $\Omega$, are chosen arbitrarily, wherein a specific detector is allocated biuniquely to each of these n volume sectors, said optical device being rotationally symmetric about the axis XX' and being of the type in which a longitudinal section in a plane P passing through the axis XX' includes a window having a front point A and a rear point B, which admits radiation along an axis H intersecting the axis XX' at a point O and forming with it an angle $\Theta$ of less than 90°, the opening angle $2\tau$ of the window being represented by the angle between two straight lines O'A and O''B, each forming an angle $\tau$ with the axis H, characterized in that said optical device includes two mirrors M1, M2 and a converging lens, the mirror M1 being represented in the section of plane P by the arc of a parabola $P_{m1}$ with its focus at a point F located in front of point O, and having as its axis of symmetry an axis D1 parallel to H and passing through F, the mirror M2 being represented in the section of plane P by the arc of parabola $P_{m2}$ with its focus at the point F and having as its axis of symmetry an axis $\delta$ passing through F and forming with the axis XX' a small angle $\alpha$; finally, the lens, having its optical center on the axis XX' approximately at the intersection of the parabola $P_{m1}$ with this axis.

6. Device according to claim 5, wherein the rearmost points C of the mirrors M1 and the foremost points H of this mirror are determined in such a way as to obtain the optimal opening over the entire optical field.

7. Target detection device using the optical device according to claim 5, characterized by the fact that it includes, located in the plane K perpendicular to the axis XX', in the focal plane of the lens a detector unit consisting of at least m detectors arranged so as to reproduce as closely as possible an annular surface S1 defined by two circles.

8. Device according to claim 7, characterized by the fact that it includes m rectangular detectors having two long sides and two short sides, placed in such a way that the line formed by one of the long sides of each of the detectors forms a regular polygon.

9. Device according to claim 7, characterized by the fact that the detectors are the pixels of a matrix of detectors the useful pixels being selected in such a way that at least one concentric circle with circles defining the annular surface S1 can be drawn entirely on the surface of the useful pixels.

10. Target detection device using the optical device according to claim 5 characterized by the fact that it includes, located in a plane K perpendicular to the axis XX' in the focal plane of the lens, a detector unit consisting of at least 2 detectors arranged so as to reproduce as closely as possible two annular surfaces S2 and S3, a first surface S2 and a second surface S3 each defined by two circles, the four circles having the same center, and the larger radius of the first annular surface S2 being smaller than the smaller radius of the second annular surface S3.

11. Device using the target detection device described in claim 8 characterized by the fact that it also includes an electronic circuit capable of receiving the signal emitted from each of the m detectors and generating a transformed, amplified signal, including information identifying the address of the detector, and a logic circuit receiving the transformed and amplified signal and generating a triggering signal to detonate, if the received signals match predetermined signals characterizing a target, a warhead whose effect is directed principally in a selectable sector of opening $2\pi/m$, and which can be positioned, then detonated on reception of the signal from the logic circuit, in order that its maximal effect occurs in the sector in which the target was detected.

12. Device according to claim 7, wherein the material of the detectors is selected from the group consisting of InSb Hg/Cd/Te in which the proportions of Hg, Cd and Te are adapted to facilitate detection of radiation in the chosen frequency band.

13. Device according to claim 8, wherein the material of the detectors is selected from the group consisting of InSb Hg/Cd/Te in which the proportions of Hg, Cd and Te are adapted to facilitate detection of radiation in the chosen frequency band.

14. Device according to claim 9, wherein the material of the detectors is selected from the group consisting of InSb or Hg/Cd/Te in which the proportions of Hg, Cd and Te are adapted to facilitate detection of radiation in the chosen frequency band.

15. Device according to claim 10, wherein the material of the detectors is selected from the group consisting of InSb and Hg/Cd/Te in which the proportions of Hg, Cd and Te are adapted to facilitate detection of radiation in the chosen frequency band.

16. Device using the target detection device described in claim 10, characterized by the fact that it also includes an electronic circuit capable of receiving the signal emitted from each of the detectors and generating a transformed, amplified signal, including information identifying the address of the detector, and a logic circuit receiving the transformed and amplified signal and generating a triggering signal to detonate, if the signals received match predetermined signals characterizing a target and if predetermined conditions of delay between the reception of a signal from detector S2 and from detector S3 are satisfied, a warhead whose effect is directed principally in a selectable sector of opening $2\pi/m$, and which can be positioned, then detonated on reception of the signal from the logic circuit, in order that its maximal effect occurs in the sector in which the target was detected.

17. Target detection device according to claim 11, wherein the differences in the levels of the signals of long duration received by one half of the detectors in relation to the other half are processed by the electronic signal transformation/amplification circuit and the logic circuit in order to determine the roll position of the projectile.

* * * * *